US012062474B2

(12) United States Patent
Hasegawa et al.

(10) Patent No.: US 12,062,474 B2
(45) Date of Patent: Aug. 13, 2024

(54) SOFT MAGNETIC ALLOY POWDER COMPRISING Fe, Co AND Si, DUST CORE, AND MAGNETIC DEVICE

(71) Applicant: TDK CORPORATION, Tokyo (JP)

(72) Inventors: Akito Hasegawa, Tokyo (JP); Satoko Mori, Tokyo (JP); Kazuhiro Yoshidome, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/968,627

(22) Filed: Oct. 18, 2022

(65) Prior Publication Data

US 2023/0130266 A1 Apr. 27, 2023

(30) Foreign Application Priority Data

Oct. 21, 2021 (JP) ................................ 2021-172504

(51) Int. Cl.
*C22C 19/07* (2006.01)
*C22C 33/02* (2006.01)
(Continued)

(52) U.S. Cl.
CPC ......... *H01F 1/15316* (2013.01); *C22C 19/07* (2013.01); *C22C 33/0257* (2013.01); *C22C 45/02* (2013.01)

(58) Field of Classification Search
CPC ......... Y10T 428/2991; Y10T 428/2994; C22C 19/007; C22C 19/07; C22C 33/0257; C22C 38/02; C22C 38/10
See application file for complete search history.

(56) References Cited

U.S. PATENT DOCUMENTS 5,348,800 A * 9/1994 Moro ........................ H01F 1/33 428/404
2020/0265976 A1* 8/2020 Yamamoto .............. C22C 38/10
2023/0125339 A1* 4/2023 Hasegawa ............... H01F 1/342 428/552

FOREIGN PATENT DOCUMENTS

JP 2003306703 A * 10/2003
JP WO-2002058085 * 5/2004
(Continued)

OTHER PUBLICATIONS

Translation JP2003306703A (Year: 2003).*
(Continued)

*Primary Examiner* — Hoa (Holly) Le
(74) *Attorney, Agent, or Firm* — Oliff PLC

(57) ABSTRACT

A soft magnetic alloy powder includes a particle body and a surface layer. The particle body comprises a soft magnetic alloy including Fe and Co. The surface layer is located on a surface side of the particle body. The surface layer includes one or more local maximum points of Si concentration and one or more local maximum points of Co concentration. The surface layer satisfies $D_{Si} \leq D_{Co}$, in which $D_{Si}$ is a distance from an interface between the particle body and the surface layer to a first Si local maximum point $L^{Si}_{max}$, and $D_{Co}$ is a distance from the interface to a first Co local maximum point $L^{Co}_{max}$.

8 Claims, 8 Drawing Sheets

(51) Int. Cl.

| | |
|---|---|
| ***C22C 45/02*** | (2006.01) |
| ***H01F 1/153*** | (2006.01) |

(56) References Cited

FOREIGN PATENT DOCUMENTS

| | | |
|---|---|---|
| JP | 2016-012630 A | 1/2016 |
| JP | 2018-073947 A | 5/2018 |

OTHER PUBLICATIONS

Translation WO2002058085 A1 (Year: 2004).*

De Toro, Role of the oxygen partial pressure in the formation of composite Co—CoO nanoparticles by reactive aggregation, J Nanopart Res (2011) 13:4583-4590 (Year: 2011).*

* cited by examiner

SOFT MAGNETIC ALLOY POWDER COMPRISING Fe, Co AND Si, DUST CORE, AND MAGNETIC DEVICE

TECHNICAL FIELD

The present disclosure relates to a soft magnetic alloy powder, a dust core, and a magnetic device.

BACKGROUND

Magnetic devices such as inductors, transformers, and choke coils are widely used in power supply circuits of various electronic devices. In recent years, reduction of energy loss in power supply circuits and improvement of power supply efficiency have been emphasized for a low-carbon society, and higher efficiency and energy saving of magnetic devices are required.

In order to satisfy the above-mentioned requirements for magnetic devices, it is essential to improve the relative permeability of the magnetic core included in the magnetic device. In order to improve the relative permeability of the magnetic core, it is necessary to increase the packing rate of the magnetic powder contained in the magnetic core. Thus, in the field of magnetic devices, various attempts have been made with the aim of improving the packing rate of magnetic core. For example, Patent Document 1 discloses that the packing rate can be improved by increasing the circularity of the magnetic powder. Moreover, Patent Document 2 discloses a technique for increasing the packing rate of the magnetic powder by using a mixed powder of coarse powder and fine powder.

When the packing rate of the magnetic powder increases, however, the number of contact points between magnetic particles increases, and the withstand voltage of the magnetic core thus tends to decrease. That is, there is a trade-off relation between the packing rate (relative permeability) and the withstand voltage. In addition, the number of contact points for each particle differs as the packing rate increases, and the difference in the number of contact points increases the variation in withstand voltage, and the m value, which indicates the degree of variation, tends to decrease. Therefore, there is a demand for the development of a technique for obtaining a high withstand voltage and a high m value even when the packing rate of the magnetic powder is increased.

Patent Document 1: JP2018073947 (A)
Patent Document 2: JP2016012630 (A)

SUMMARY

The present disclosure has been achieved under such circumstances. It is an object of the present disclosure to provide a soft magnetic alloy powder, a dust core, and a magnetic device capable of achieving a high withstand voltage and a high m value.

To achieve the above object, a soft magnetic alloy powder according to the present disclosure comprises:

a particle body comprising a soft magnetic alloy including Fe and Co; and a surface layer located on a surface side of the particle body, wherein the surface layer includes one or more local maximum points of Si concentration and one or more local maximum points of Co concentration, and $D_{Si} \leq D_{Co}$ is satisfied, in which $D_{Si}$ is a distance from an interface between the particle body and the surface layer to a first Si local maximum point $L^{Si}_{max}$ as a local maximum point located closest to a particle center among the one or more local maximum points of Si concentration, and $D_{Co}$ is a distance from the interface to a first Co local maximum point $L^{Co}_{max}$ as a local maximum point located closest to the particle center among the one or more local maximum points of Co concentration.

When the soft magnetic alloy powder having the above-mentioned characteristics is used, the withstand voltage and the m value can be improved more than before with a high relative permeability.

Preferably, the surface layer satisfies $D_{Si} < D_{Co}$.

Preferably, the surface layer comprises an oxide phase.

Preferably, the surface layer comprises a Si oxide phase including a Si oxide, and the $L^{Si}_{max}$ exists in the Si oxide phase.

Preferably, the surface layer comprises a Co oxide phase including a Co oxide, the $L^{Co}_{max}$ exists in the Co oxide phase, and a part of the Co oxide phase overlaps with a part of a surface side of the Si oxide phase. Instead, the Co oxide phase may be located closer to a surface side of the surface layer than the Si oxide phase.

The use of the soft magnetic alloy powder according to the present disclosure is not limited and can be applied to various magnetic devices. For example, the soft magnetic alloy powder according to the present disclosure can be favorably used as a dust core material in magnetic devices, such as inductors, transformers, and choke coils.

BRIEF DESCRIPTION OF THE DRAWING(S)

DETAILED DESCRIPTION

Hereinafter, the present disclosure is explained in detail based on an embodiment shown in the figures.

Figure 1:
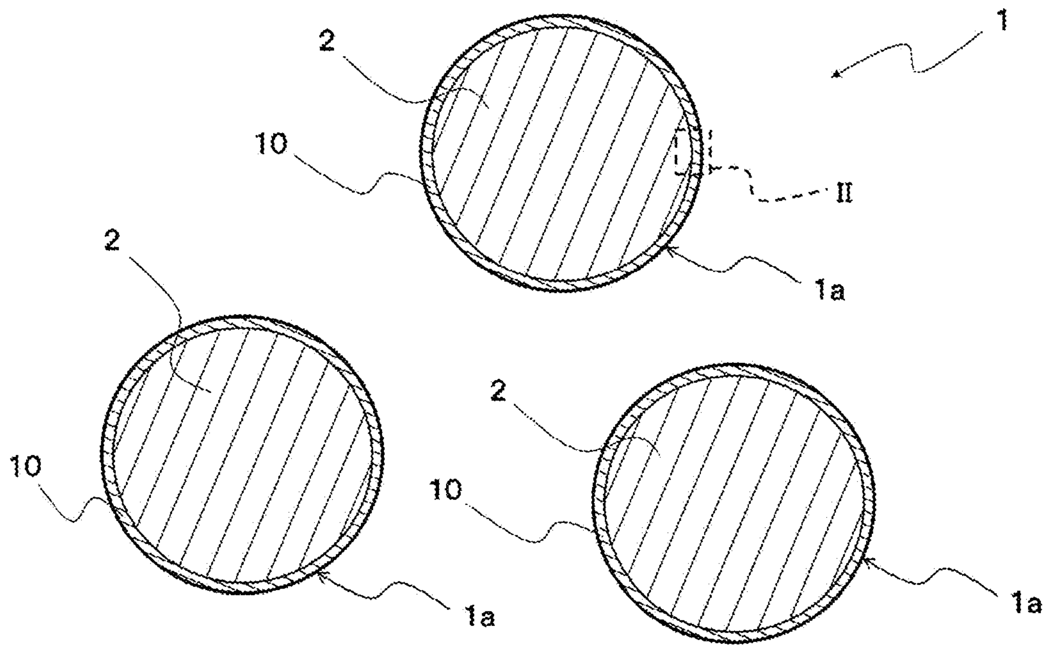
FIG. 1 is a schematic cross-sectional view illustrating a soft magnetic alloy powder according to an embodiment of the present disclosure.

As shown in FIG. 1, a soft magnetic alloy powder 1 of the present embodiment includes first particles 1*a* each including a surface layer 10. In addition to the first particles 1*a*, the soft magnetic alloy powder 1 may include other particles each including no surface layer 10, and other particles may have different composition and particle size from those of the first particles 1*a*. The ratio of the first particles 1*a* in the soft magnetic alloy powder 1 may be appropriately determined according to the application of the soft magnetic alloy powder 1 and is not limited. For example, the mass ratio of the first particles 1*a* can be 10% to 100% and is preferably 60% to 90%.

The average particle size of the soft magnetic alloy powder 1 is not limited and can be, for example, 0.5 μm to 150 μm and is preferably 0.5 μm to 25 μm. When the soft magnetic alloy powder 1 includes other particles each including no surface layer 10, the average particle size of the first particles 1*a* is preferably 5 μm or more, and the average particle size of these other particles is preferably less than 5 μm.

Note that, the above-mentioned average particle size can be measured by various particle size analyzing methods, such as a laser diffraction method, but is preferably measured by a particle image analyzer Morphologi G3 (made by Malvern Panalytical Ltd). In Morphologi G3, the soft magnetic alloy powder is dispersed using air, and a projected area of the individual particles constituting the powder is measured so as to obtain a particle size distribution by circle equivalent diameters from the projected areas. Then, in the obtained particle size distribution, the average particle size is a particle size where a volume-based or number-based cumulative relative frequency is 50%. When the soft magnetic alloy powder 1 is included in the magnetic core, the average particle size is obtained by measuring the circle equivalent diameters of each particle included in the cross section of the magnetic core by cross-sectional observation using an electron microscope (SEM, STEM, or the like).

Figure 2:
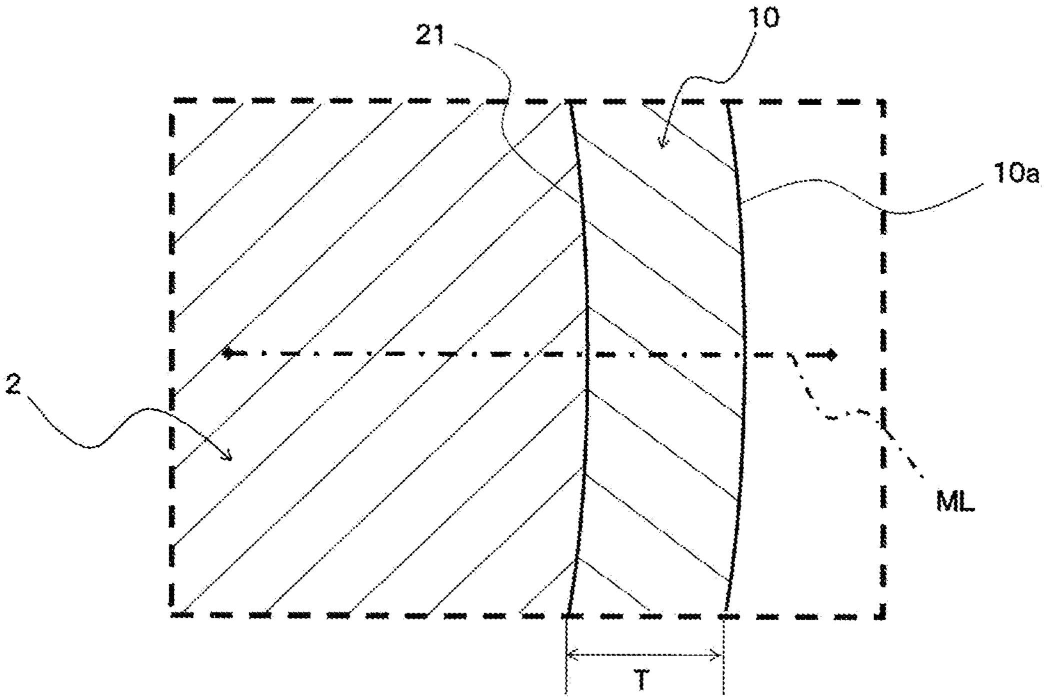
FIG. 2 is a main-part cross-sectional view in which a region II shown in FIG. 1 is enlarged.

FIG. 2 is a cross-sectional view in which the vicinity of the surface of the first particle 1*a* is enlarged. As shown in FIG. 2, the first particle 1*a* includes a particle body 2 and a surface layer 10 located on the surface side of the particle body 2. In the present embodiment, "surface side" means the side closer to the outside of the particle in the direction from the center of the particle toward the surface of the particle.

(Particle Body 2)

The particle body 2 is a base portion that occupies at least 90 vol % or more of the volume of the first particle 1*a*. Thus, the average composition of the first particle 1*a* can be regarded as the composition of the particle body 2, and the crystal structure of the first particle 1*a* can be regarded as the crystal structure of the particle body 2. The volume ratio of the particle body 2 can be substituted for the area ratio, and at least 90% or more of the cross-sectional area of the first particle 1*a* is the particle body 2.

The particle body 2 has a soft magnetic alloy composition including Fe and Co, and a specific alloy composition is not limited. For example, the particle body 2 can be a crystal type soft magnetic alloy of a Fe—Co based alloy, a Fe—Co—V based alloy, a Fe—Co—Si based alloy, a Fe—Co—Si—Al based alloy, or the like. Instead, from the point of lowering a coercivity, the particle body 2 is preferably constituted by an amorphous alloy composition or a nanocrystal alloy composition.

As an amorphous or nanocrystal soft magnetic alloy, a Fe—Co—P—C based alloy, a Fe—Co—B based alloy, a Fe—Co—B—Si based alloy, or the like may be mentioned. More specifically, the particle body 2 is preferably constituted by an alloy composition satisfying a compositional formula of $(Fe_{(1-(\alpha+\beta))}Co_{\alpha}Ni_{\beta})_{(1-(a+b))}X1_{a}X2_{b}$ When the particle body 2 is constituted by the alloy composition satisfying the above-compositional formula, a crystal structure made of amorphous, heteroamorphous, or nanocrystals tends to be obtained easily.

In the above-mentioned compositional formula, X1 is one or more elements selected from B, P, C, Si, and Al, and X2 is one or more elements selected from Ti, Zr, Hf, Nb, Ta, Mo, W, Cr, Ga, Ag, Zn, S, Ca, Mg, V, Sn, As, Sb, Bi, N, O, Au, Cu, rare earth elements, and platinum group elements. The rare earth elements include Sc, Y, and lanthanoids. The platinum group elements include Ru, Rh, Pd, Os, Ir, and Pt. Also, α, β, a, and b represent atomic ratios, and these atomic ratios preferably satisfy the following relations.

The Co content (α) with respect to Fe is within a range of $0.005 \leq \alpha \leq 0.700$, may be within a range of $0.010 \leq \alpha \leq 0.600$, may be within a range of $0.030 \leq \alpha \leq 0.600$, or may be within a range of $0.050 \leq \alpha \leq 0.600$. When the Co content (α) is within the above-mentioned range, the saturation magnetic flux density (Bs) and the corrosion resistance of the soft magnetic alloy powder 1 are improved. From the point of improving Bs, $0.050 \leq \alpha \leq 0.500$ is preferably satisfied. As the Co content (α) increases, the corrosion resistance tends to improve. When the Co content (α) is too large, however, Bs tends to decrease easily.

Also, the Ni content (β) with respect to Fe may be within a range of $0 \leq \beta \leq 0.200$. That is, the soft magnetic alloy may not include Ni, and the Ni content (β) may be within a range of $0.005 \leq \beta \leq 0.200$. From the point of improving Bs, the Ni content (β) may be within a range of $0 \leq \beta \leq 0.050$, may be within a of $0.001 \leq \beta \leq 0.050$, or may be within a range of $0.005 \leq \beta \leq 0.010$. As the Ni content (β) increases, the corrosion resistance tends to improve. When the Ni content (β) is too large, however, Bs decreases.

When a sum of atomic ratios of elements constituting the soft magnetic alloy is 1, an atomic ratio (1−(a+b)) of a total amount of Fe, Co, and Ni is preferably within a range of $0.720 \leq (1-(a+b)) \leq 0.950$ and is more preferably within a range of $0.780 \leq (1-(a+b)) \leq 0.890$. When the above-mentioned relation is satisfied, Bs tends to improve easily. When $0.720 \leq (1-(a+b)) \leq 0.890$ is satisfied, amorphous is easily obtained, and the coercivity tends to decrease.

X1 may be included as impurities or may be added intentionally. The X1 content (a) may be within a range of $0 \leq a \leq 0.200$. From the point of improving Bs, $0 \leq a \leq 0.150$ is preferably satisfied.

X2 may be included as impurities or may be added intentionally. The X2 content (b) may be within a range of $0 \leq b \leq 0.200$. From the point of improving Bs, $0 \leq b \leq 0.150$ is preferably satisfied, and $0 \leq b \leq 0.100$ is more preferably satisfied.

The composition of the above-mentioned particle body 2 (i.e., the composition of the first particle 1*a*) can be analyzed, for example, by inductively coupled plasma (ICP). Here, when it is difficult to determine an oxygen amount by ICP, an impulse heat melting extraction method can also be used. If it is difficult to determine a carbon amount and a sulfur amount by ICP, an infrared absorption method can also be used.

Except for ICP, a compositional analysis may be carried out by energy dispersive X-ray spectroscopy (EDX) or electron probe microanalyzer (EPMA) attached to an electron microscope. For example, regarding the soft magnetic alloy powder 1 included in a dust core containing a resin component, a compositional analysis by ICP may be difficult in some cases. In this case, the compositional analysis may be carried out using EDX or EPMA. If a detailed compositional analysis is difficult by any of the above-mentioned methods, the compositional analysis may be performed using three dimensional atom probe (3DAP). When 3DAP is used, the composition of the particle body 2 can be measured without the influence of the resin component, a surface oxidation, and the like in the area of analysis. This is because 3DAP can measure an average composition by determining a small area (e.g., an area of φ20 nm×100 nm) in the first particle 1*a*.

Figure 3A:
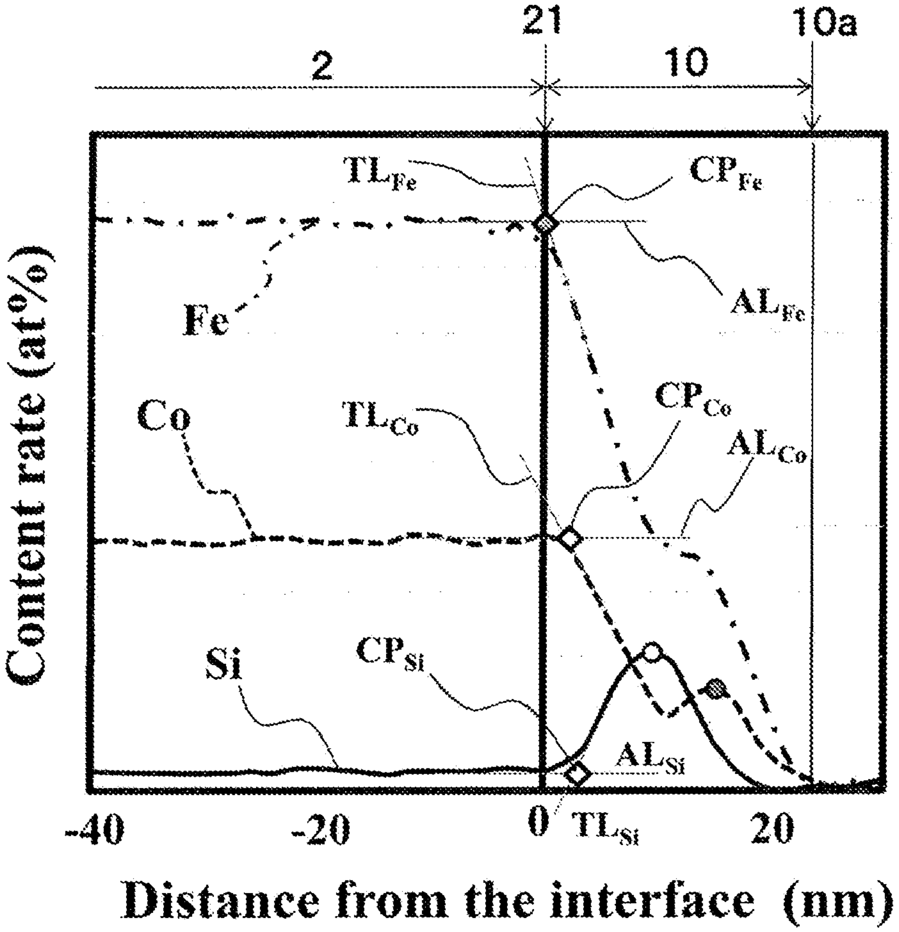
FIG. 3A is a graph representing an example of line analysis data.

Note that, when a cross section near the surface of the first particle 1*a* is analyzed by a line analysis using EDX or electron energy loss spectroscopy (EELS), the particle body 2 can be recognized as an area having stable concentrations of Fe and Co (see FIG. 3A). For example, the average composition obtained by a mapping analysis of the particle body 2 can be considered as the composition of the first particle 1*a*. In this case, the mapping analysis is performed using EDX or EELS. At this time, an area to be measured is an area that is 100 nm or more away in a depth direction from the surface of the first particle 1*a* (an area corresponding to the particle body 2), and an area of measurement is about 256 nm×256 nm.

The crystal structure of the particle body 2 (i.e., the crystal structure of the first particle 1*a*) can be a crystalline structure, a nanocrystal structure, or an amorphous structure and is preferably a nanocrystal structure or an amorphous structure from the point of lowering the coercivity. For example, an amorphous degree X of the particle body 2 is preferably 85% or more. The crystal structure having an amorphous degree X of 85% or more is a structure that is mostly comprised of amorphous or heteroamorphous. The structure comprised of heteroamorphous is a structure in which crystals slightly exist inside amorphous. That is, in the present embodiment, an "amorphous structure" is a crystal structure having an amorphous degree X of 85% or more and means that crystals may be included in a range where this amorphous degree X is satisfied.

Note that, when the structure is heteroamorphous, the average crystal grain size of crystals existing in the amorphous structure is preferably within the range of 0.1 nm or more and 10 nm or less. In the present embodiment, "nanocrystal" means a crystal structure having an amorphous degree X of less than 85% and an average crystal grain size of 100 nm or less (preferably, 3 nm to 50 nm), and "crystalline" means a crystal structure having an amorphous degree X of less than 85% and an average crystal grain size of larger than 100 nm.

The amorphous degree X can be measured by X-ray crystallography using XRD. Specifically, 2θ/θ measurement is performed using XRD to the powder of the first particle 1*a*, and an X-ray diffraction chart is obtained. At this time, a measurement range of diffraction angle 2θ may be set so that an amorphous-derived halo pattern can be confirmed. For example, it is preferable to set 2θ in a range including 30° to 60°.

Next, the X-ray diffraction chart is profile-fitted using a Lorentz function represented by the following equation (2). In this profile fitting, a difference between the integrated intensities actually measured by XRD and the integrated intensities calculated using the Lorentz function is preferably determined within 1%. As a result of this profile fitting, a crystal scattering integrated intensity Ic and an amorphous scattering integrated intensity Ia are obtained. Then, the amorphous degree X is obtained by placing the crystal scattering integrated intensity Ic and the amorphous scattering integrated intensity Ia in the following equation (1).

$$X=100-(Ic/(Ic+Ia)\times 100)$$ Equation (1)

Ic: crystal scattering integrated intensity
Ia: amorphous scattering integrated intensity {Formula 1]

$$f(x)=\frac{h}{1+\frac{(x-u)^2}{w^2}}+b$$ (Equation 2)

h: peak height
u: peak position
w: half bandwidth
b: background height

Note that, a method of measuring the amorphous degree X is not limited to the above-mentioned method using XRD, and the amorphous degree X may be measured by electron backscatter diffraction (EBSD) or electron diffraction.

(Surface Layer 10)

The surface layer 10 is an area where the content rate of constituent elements of the soft magnetic alloy, such as Fe and Co, is different from that in the particle body 2. The surface layer 10 covers at least a part of periphery of the particle body 2. The coverage of the surface layer 10 with respect to the particle body 2 in the cross section of the first particle 1*a* is not limited and can be, for example, 50% or more, preferably 80% or more.

The surface layer 10 can be analyzed by observing a cross section near the surface of the first particle 1*a* with a scanning transmission electron microscope (STEM) or a transmission electron microscope (TEM) and performing a line analysis using EDX or EELS at that time. In the line analysis, as shown in FIG. 2, a measurement line ML is drawn along a direction substantially perpendicular to the particle surface, and a component analysis is performed at predetermined intervals on the measurement line to obtain a concentration distribution of constituent elements near the surface. At this time, the measurement intervals for component analysis are preferably 1 nm, and the raw data measured at 1 nm intervals is preferably averaged to remove noise. More specifically, in the averaging process, an interval average value is preferably obtained at each measurement point. For example, the interval average value at a certain measurement point may be calculated by averaging the measurement values of five points, including the certain measurement point, two forward points adjacent to the certain measurement point, and two rear points adjacent to the certain measurement point. Then, the interval average values at each of the measurement points are plotted to obtain a concentration distribution graph.

Figure 3B:
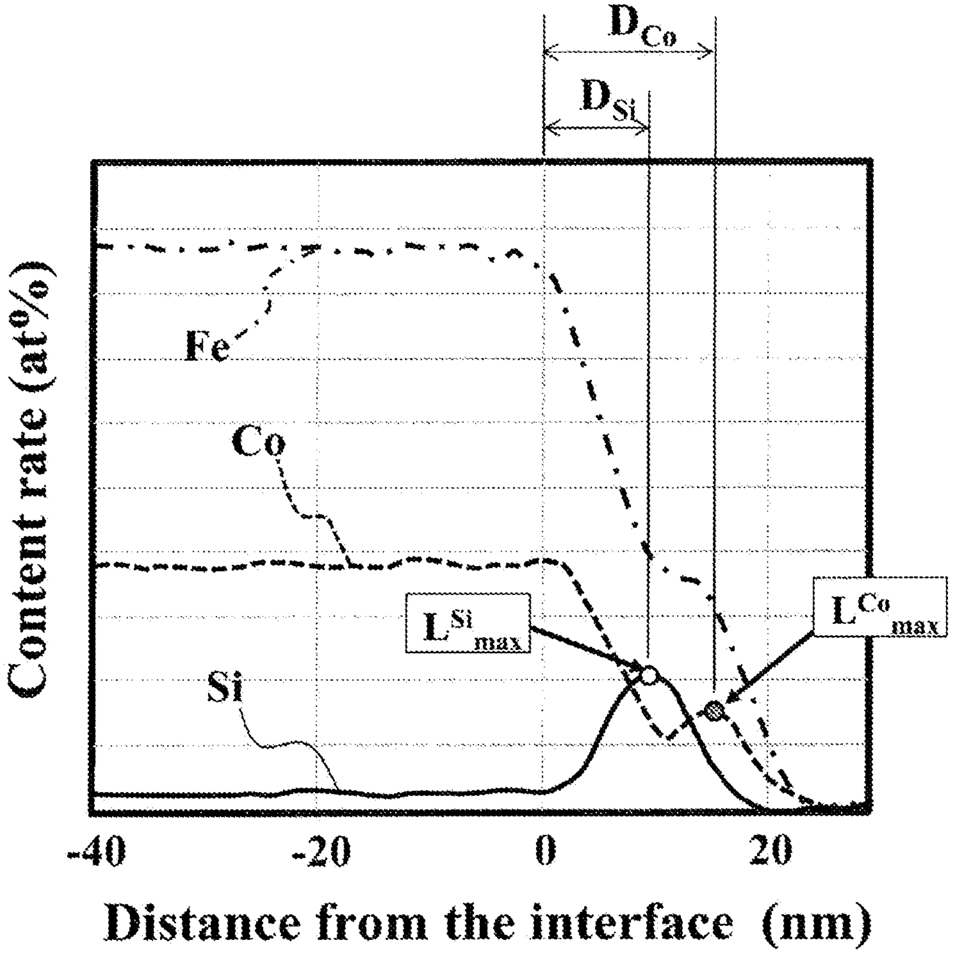
FIG. 3B is a graph representing an example of line analysis data.

For example, the graphs shown in FIG. 3A and FIG. 3B are an example of line analysis data near the surface of the first particle 1*a*. For convenience of explanation, two graphs (FIG. 3A and FIG. 3B) are shown, but both of FIG. 3A and FIG. 3B show the same measurement example. The horizontal axis of each graph is the distance from a specific point (interface 21). The direction from the specific point to the particle surface side (particle outer side) is the positive direction, and the direction from the specific point to the particle inner side is the negative direction. The vertical axis of each graph is the content rate of constituent elements (Fe, Co, and Si).

As shown in FIG. 3A, in the particle body 2, the concentrations of constituent elements of Fe, Co, Si, and the like are stable within the range of average concentration ±1 at %. On the surface side of the particle body 2, there is a variation region in which the concentrations of the constituent elements are different from those of the particle body 2, and this variation region is the surface layer 10. In the present embodiment, a change point CP in the concentration distribution of each constituent element is determined, and the change point located on the innermost side of the particle (particle center side) among the change points CP of the plurality of constituent elements is determined as an "interface 21" between the particle body 2 and the surface layer 10.

Specifically, a method for determining the change points CP and the interface 21 is described. First, a horizontal line AL corresponding to the average concentration in the particle body 2 is drawn in the concentration distribution of each constituent element. Then, an approximation straight line TL is drawn in a region where the concentration of the constituent element monotonically increases or decreases from the particle body 2 toward the particle surface side. The intersection between the horizontal line AL and the approximate straight line TL is defined as a change point CP in the concentration distribution of each constituent element. In FIG. 3A, the Fe change point $CP_{Fe}$ is located on the innermost side of the particle among the Fe change point $CP_{Fe}$, the Co change point $CP_{Co}$, and the Si change point $CP_{Si}$. Thus, in the graph of FIG. 3A, the position where the Fe change point $CP_{Fe}$ exists is defined as the interface 21, and the interface 21 is determined as the zero point on the horizontal axis of the graph.

As shown in FIG. 3B, the surface layer 10 (variation region) includes at least one local maximum point of Si concentration and at least one local maximum point of Co concentration in the concentration distribution in the direction substantially perpendicular to the particle surface. Here, the local maximum point in the present embodiment is a point at which the concentration distribution switches from an increasing tendency to a decreasing tendency in the positive direction from the interface 21 toward the surface side. That is, the local maximum point is an extreme value in a local region where the concentration of the predetermined element changes convexly. A plurality of local maximum points may exist, and the local maximum points and the global maximum value in the entire surface layer 10 do not necessarily correspond with each other.

Among one or more local maximum points of Si concentration, the local maximum point closest to the interface 21 (i.e., the local maximum point located closest to the center of the particle) is defined as a first Si local maximum point $L^{Si}_{max}$. In the graph of FIG. 3B, $L^{Si}_{max}$ is indicated by a white blank circle. On the other hand, among one or more local maximum points of Co concentration, the local maximum point closest to the interface 21 is defined as a first Co local maximum point $L^{Co}_{max}$. In the graph of FIG. 3B, $L^{Co}_{max}$ is indicated by a black-painted circle.

In the concentration distribution near the surface as shown in FIG. 3B, the relation between $D_{Si}$ and $D_{Co}$ satisfies $D_{Si} \le D_{Co}$ and preferably satisfies $D_{Si} < D_{Co}$, where $D_{Si}$ is a distance from the interface 21 to $L^{Si}_{max}$, and $D_{Co}$ is a distance from the interface 21 to $L^{Co}_{max}$.

As described above, since the surface layer 10 includes $L^{Si}_{max}$ and $L^{Co}_{max}$ and satisfies $D_{Si} \le D_{Co}$, the magnetic core including the soft magnetic alloy powder 1 of the present embodiment can improve the withstand voltage with a high relative permeability. In addition, variations in withstand voltage can be reduced (i.e., m value can be increased), and magnetic devices can be produced stably. In particular, since the surface layer 10 satisfies $D_{Si} < D_{Co}$, the withstand voltage and the m value can be further improved.

When the above-mentioned relation between $D_{Si}$ and $D_{Co}$ is represented by the formula "$D_{Co}-D_{Si}$", "$D_{Co}-D_{Si}$" is 0 nm or more, preferably larger than 0 nm, more preferably 3 nm or more, and still more preferably 5 nm or more. The upper limit of "$D_{Co}-D_{Si}$" is not limited and can be, for example, 30 nm or less and may be 10 nm or less. The value of $D_{Si}$ and the value of $D_{Co}$ are not limited. For example, $D_{Si}$ is preferably 20 nm or less, and $D_{Co}$ is preferably 30 nm or less.

FIG. 3A and FIG. 3B show the concentration distributions of Fe, Co, and Si, but the surface layer 10 may include elements constituting the average composition of the first particle 1*a*, such as Cr, Al, B, and P, in addition to the above-mentioned elements.

The surface layer 10 can be a metal phase, an oxide phase, a metal compound phase other than an oxide, or the like and preferably includes an oxide phase. When the surface layer 10 includes an oxide phase, a higher concentration of oxygen than in the particle body 2 is detected in the surface layer 10. For example, the graphs shown in FIG. 4A and FIG. 4B are an example of line analysis data of the surface layer 10 including an oxide phase.

Figure 4A:
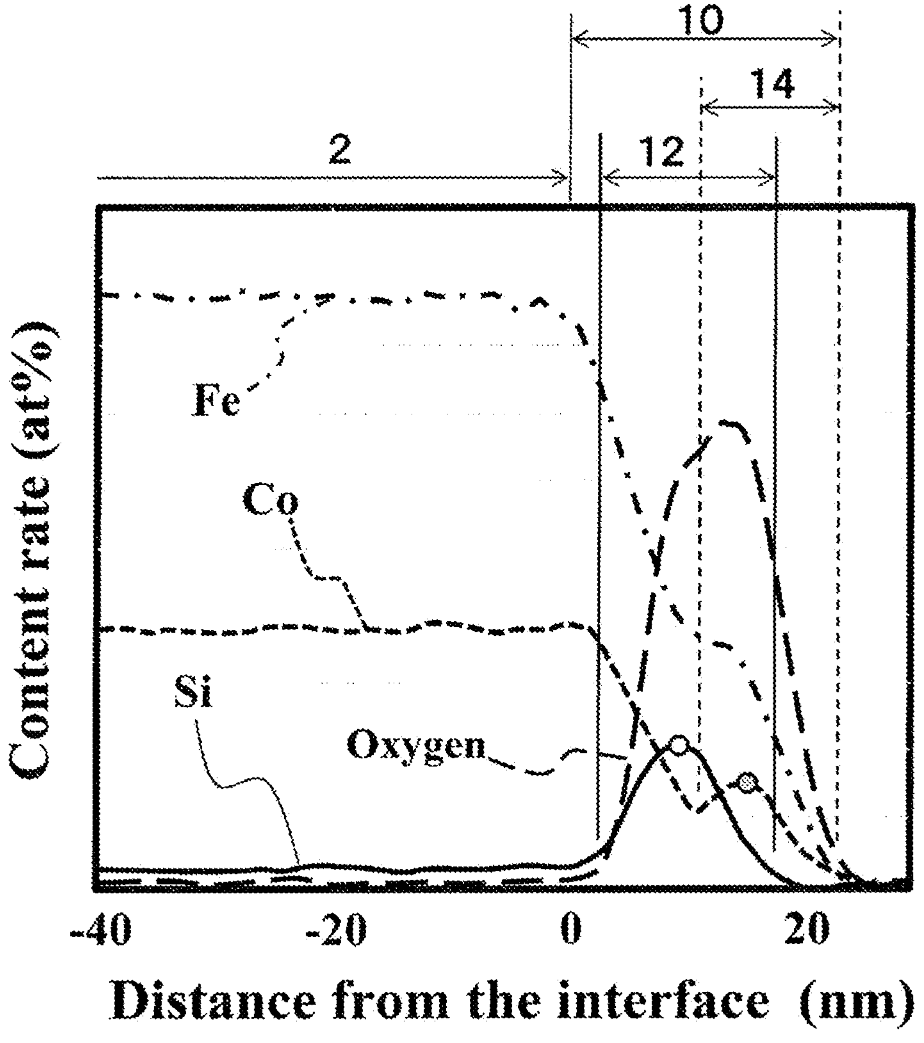
FIG. 4A is a graph representing an example of line analysis data.

As shown in FIG. 4A, when the oxygen concentration in the surface layer 10 is higher than that in the particle body 2, the surface layer 10 includes an oxide phase. In FIG. 4A, the Si concentration peak and the Co concentration peak overlap with the oxygen high concentration region, and the surface layer 10 includes a Si oxide phase 12 including a Si oxide and a Co oxide phase 14 including a Co oxide.

The Si oxide phase 12 is a region where the Si concentration is higher than that in the particle body 2 and a convex peak related to the Si concentration exists. $L^{Si}_{max}$ is located in the Si oxide phase 12. The Co oxide phase 14 is a region where a convex peak related to the Co concentration exists, and $L^{Co}_{max}$ is located in the Co oxide phase 14. In FIG. 4A, a part of the Co oxide phase 14 overlaps with a part of the Si oxide phase 12. The positional relation between the Si oxide phase 12 and the Co oxide phase 14 is not limited to the mode shown in FIG. 4A, and the Co oxide phase 14 may be located closer to the surface side than the Si oxide phase 12 as shown in FIG. 4B. That is, in the surface layer 10 of the first particle 1*a*, the position of $L^{Si}_{max}$ and the position of $L^{Co}_{max}$ satisfies $D_{Si} \le D_{Co}$. As shown in FIG. 4A and FIG. 4B, the Si oxide phase 12 and the Co oxide phase 14 may or may not overlap with each other.

Figure 4B:
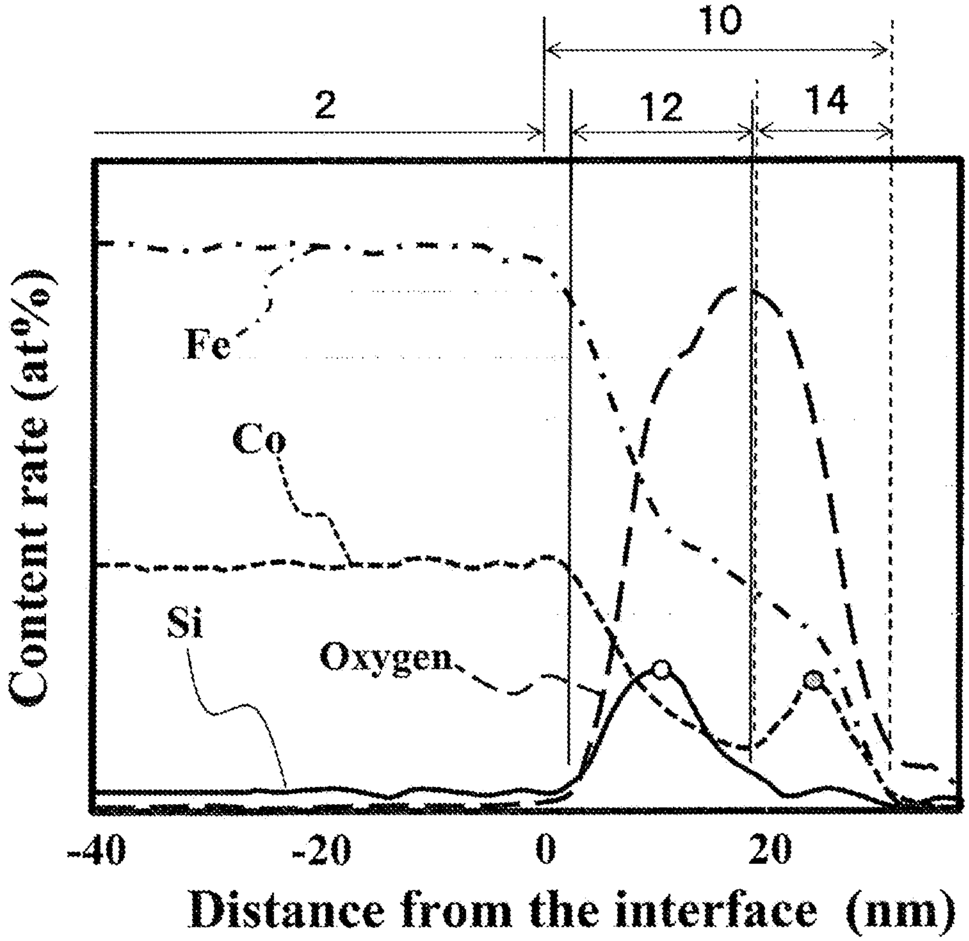
FIG. 4B is a graph representing an example of line analysis data.

Since the surface layer 10 includes the oxide phase (12, 14) structure as shown in FIG. 4A and FIG. 4B, the withstand voltage and the m value of the magnetic core can be further improved.

In addition to Si, Co, and O, each oxide phase (12, 14) may include elements constituting the average composition of the first particles 1*a*, such as Fe, Cr, Al, B, and P.

In the soft magnetic alloy powder 1 of the present embodiment, the thickness T of the surface layer 10 is not limited, but is, for example, preferably 1 nm or more and 30 nm or less, more preferably 5 nm or more and 20 nm or less. The thickness T of the surface layer 10 can be calculated as a distance from the interface 21 to an outer surface 10*a* of the surface layer 10. In the measurement of the thickness T, the interface 21 can be determined based on the change points CP as mentioned above, and the outer surface 10*a* can be determined by the following method.

For example, in the graph of FIG. 3A, the outer surface 10*a* of the surface layer 10 constitutes the outermost surface of the first particle 1*a*. In this case, since the outermost surface of the particle can be visually recognized in a TEM image or a STEM image, the outer surface 10*a* in the concentration distribution graph can be determined by comparing the TEM image or the STEM image with the concentration distribution graphs shown in FIG. 3A and FIG. 3B.

The first particle 1*a* may include an insulating layer covering the surface layer 10. The insulating layer is a coated layer formed by coating or the like after forming the surface layer 10 and has an average thickness of preferably 1 nm or more and 100 nm or less, more preferably 50 nm or less. In the TEM image or the STEM image, the insulating layer may be recognized as a region having a different contrast from that of the particle body 2 and the surface layer 10. In this case, the outer surface 10*a* of the surface layer 10 can be determined based on the contrast of the TEM image or the STEM image. Instead, the outer surface 10*a* of the surface layer 10 may be determined based on the concentration distribution of an element M specific to the insulating layer. According to the line analysis result, the concentration of the specific element M increases in the region where the surface layer 10 is switched to the insulating layer, and the change point where the specific element M increases may thus be defined as the outer surface 10*a* of the surface layer 10.

(Method of Producing Soft Magnetic Alloy Powder 1)

Hereinafter, a method of producing the soft magnetic alloy powder 1 according to the present embodiment is described. The soft magnetic alloy powder 1 according to the present embodiment can be produced by performing a surface modification treatment after producing a powder by a well-known method.

A method of producing the soft magnetic alloy powder before performing a surface modification treatment is not limited. For example, the soft magnetic alloy powder may be produced by an atomizing method, such as a water atomizing method and a gas atomizing method. Instead, the soft magnetic alloy powder may be produced by a synthesis method, such as a CVD method, using at least one or more of metal salt evaporation, reduction, and thermal decomposition. Instead, the soft magnetic alloy powder may be produced using an electrolysis method or a carbonyl method. Moreover, the soft magnetic alloy powder may be produced by pulverizing a starting alloy in the form of ribbon or thin plate. The produced powder may be appropriately classified so as to adjust the particle size of the soft magnetic alloy powder.

Next, the surface layer 10 is formed on the surface of the first particle 1*a* by subjecting the soft magnetic alloy powder to a surface modification treatment. The method for surface modification includes a CVD method, a mechanochemical method, and the like and is not limited. In the present embodiment, it is particularly preferable to carry out a surface modification treatment by the mechanochemical method in an atmosphere in which the oxygen partial pressure is controlled. Hereinafter, the mechanochemical method is described.

Conventionally, as a surface treatment method for the soft magnetic alloy powder, a method of forming an oxide layer on the surface of the particle by subjecting the powder to a heat treatment is known. In the conventional heat treatment, however, it is necessary to adjust conditions, such as temperature, according to the type of powder, and it is thus difficult to uniformly control the composition and the internal structure of the oxide layer.

On the other hand, the mechanochemical method is a method of applying a mechanofusion apparatus to a surface modification of the soft magnetic alloy powder. The mechanofusion apparatus is an apparatus that is conventionally used for a coating treatment of various powders. The inventors of the present disclosure have found that a desired surface layer 10 can be formed uniformly even for different types of powders by using a mechanofusion device to form the surface phase of powder by a different method from a conventional coating treatment.

In the mechanochemical method, first, the inside of the mechanofusion apparatus is made into a desired oxidizing atmosphere. For example, the oxygen partial pressure in the apparatus can be adjusted by using a mixed gas of Ar gas and air as the atmospheric gas to be filled in the apparatus and controlling the partial pressure of Ar gas and air in the mixed gas. The oxygen partial pressure in the apparatus is, for example, preferably 100 ppm to 3000 ppm, more preferably 500 ppm to 3000 ppm, and even more preferably 500 ppm to 1000 ppm. In the mixed gas, oxygen gas may be used instead of air, and inert gas, such as nitrogen gas and helium gas, may be used instead of Ar gas.

Next, the soft magnetic alloy powder is introduced into a rotating rotor of the mechanofusion apparatus, and the rotating rotor is rotated. A press head is installed inside the rotating rotor, and when the rotating rotor is rotated, the soft magnetic alloy powder is compressed in the gap between the inner wall surface of the rotating rotor and the press head. At this time, friction occurs between the soft magnetic alloy powder and the inner wall surface of the rotating rotor, and the soft magnetic alloy powder locally heats up. Due to this frictional heat, the surface layer 10 is formed on the surface of the particle body 2. In particular, the surface layer 10 including the oxide phases (12, 14) is easily formed by the above-mentioned mechanochemical method.

In the mechanochemical method, it is preferable to control the oxygen partial pressure within an appropriate range and to appropriately control the rotational speed of the rotating rotor and the gap between the inner wall surface of the rotating rotor and the press head. For example, the frictional heat generated with a low rotational speed is small, and the surface layer 10 is hard to be formed. On the other hand, if the rotational speed is too large, the compressive stress applied to the powder is large, and the surface layer 10 is likely to be formed. However, if the rotational speed is too large, the particle body 2 and the surface layer 10 are likely to be destroyed, and this may lead to deterioration of magnetic characteristics. In addition, if the gap between the inner wall surface of the rotating rotor and the press head is too large, the amount of frictional heat generated is small, and the surface layer 10 is hard to be formed. On the other hand, the smaller the gap between the inner wall surface of the rotating rotor and the press head is, the larger the compressive stress applied to the powder is, and the easier it is for the surface layer 10 to be formed, but the particle body 2 and the surface layer 10 are more likely to be destroyed.

After the surface modification by the mechanochemical method, a heat treatment may be performed in an atmosphere in which the surface structure does not change in order to remove the stress generated by the mechanochemical method.

When an insulating layer is formed on the surface layer 10, a coating treatment, such as a phosphate coating treatment, mechanical alloying, a silane coupling treatment, and hydrothermal synthesis, is performed after the surface modification treatment by the mechanochemical method. The material of the insulating layer to be formed includes phosphates, silicates, soda-lime glass, borosilicate glass, lead glass, aluminosilicate glass, borate glass, sulfate glass, or the like. For example, phosphates include magnesium phosphate, calcium phosphate, zinc phosphate, manganese phosphate, cadmium phosphate, and the like. Also, silicates include sodium silicate, and the like.

Through the above-mentioned steps, the soft magnetic alloy powder 1 including the surface layer 10 is obtained.

(Use of Soft Magnetic Alloy Powder 1)

The use of the soft magnetic alloy powder 1 according to the present embodiment is not limited and can be applied to various magnetic devices. In particular, the soft magnetic alloy powder 1 can be favorably used as a dust core material in magnetic devices, such as inductors, transformers, and choke coils. Hereinafter, an example of a dust core and a magnetic device including the soft magnetic alloy powder 1 is described with reference to FIG. 5 and FIG. 6.

(Dust Core 40)

A dust core 40 including the soft magnetic alloy powder 1 is formed to have a predetermined shape, and its outer dimensions and shape are not limited. As shown in the schematic cross-sectional view of FIG. 5, the dust core 40 includes at least the soft magnetic alloy powder 1 and a resin 4 as a binder and is fixed in a predetermined shape by bonding the constituent particles (1_a_, 1_b_) of the soft magnetic alloy powder 1 via the resin 4.

Figure 5:
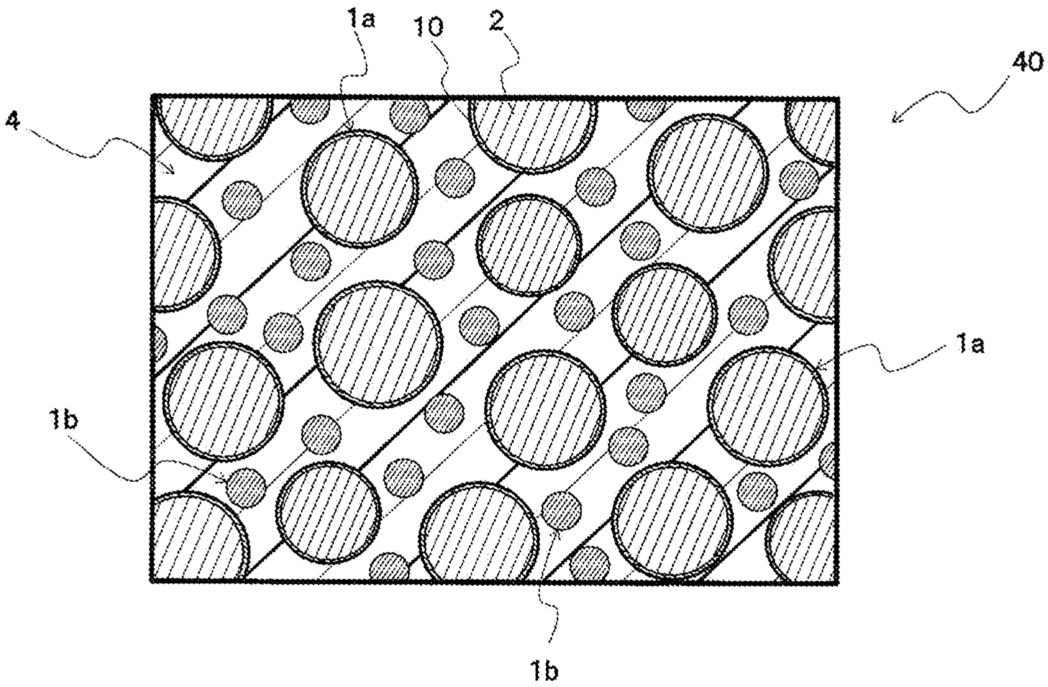
FIG. 5 is a schematic cross-sectional view illustrating an example of a dust core including the soft magnetic alloy powder shown in FIG. 1.

The soft magnetic alloy powder 1 of the dust core 40 may be composed only of the first particles 1_a_ each including the surface layer 10, but is preferably composed by, as shown in FIG. 5, mixing the first particles 1_a_ and the fine particles 1_b_ having a smaller average particle size than the first particles 1_a_. In this case, the average particle size of the first particles 1_a_ is preferably 5 μm or more, and the average particle size of the fine particles 1_b_ is preferably less than 5 μm. The material of the fine particles 1_b_ is not limited and may be, for example, pure iron, an Fe—Ni alloy, or the like. Each of the fine particles 1_b_ shown in FIG. 5 has no insulating layer, but an insulating layer may be formed on the surface of each of the fine particles 1_b_.

The ratio of the first particles 1_a_ and the fine particles 1_b_ in the dust core 40 is not limited. For example, the mass ratio indicated by "first particles 1_a_:fine particles 1_b_" can be in the range of 10:90 to 90:10, preferably in the range of 60:40 to 90:10.

The material of the resin 4 is not limited and may be, for example, a thermosetting resin, such as epoxy resin. The content rate of the resin 4 in the dust core 40 is not limited and is preferably, for example, 1.0 mass % to 2.5 mass %.

The packing rate of the soft magnetic alloy powder 1 in the dust core 40 can be controlled by the manufacturing conditions, such as compacting pressure, the content rate of the resin 4, or the like and can be, for example, 70 vol % to 90 vol %. From the point of increasing the relative permeability, the packing rate of the soft magnetic alloy powder 1 is preferably 80 vol % or more.

In conventional dust cores, when the packing rate of the magnetic powder is high, the relative permeability is high, but the withstand voltage is low, and it is thus difficult to achieve both high relative permeability and high withstand voltage. On the other hand, in the dust core 40 of the present embodiment, since the surface layer 10 having predetermined characteristics exists on each constituent particle (1_a_) of the soft magnetic alloy powder 1, it is possible to improve withstand voltage and m value even at a high packing rate of 80 vol % or more.

The method of manufacturing the dust core 40 is not limited. For example, the first particles 1_a_ subjected to a surface modification treatment by a mechanochemical method and the fine particles 1_b_ are mixed, and the resulting mixed powder and a thermosetting resin are thereafter kneaded to obtain a resin compound. Then, the resin compound is filled in a die and molded with pressure, and the thermosetting resin is thereafter cured to obtain the dust core 40 as shown in FIG. 5.

(Magnetic Device 100)

Figure 6:
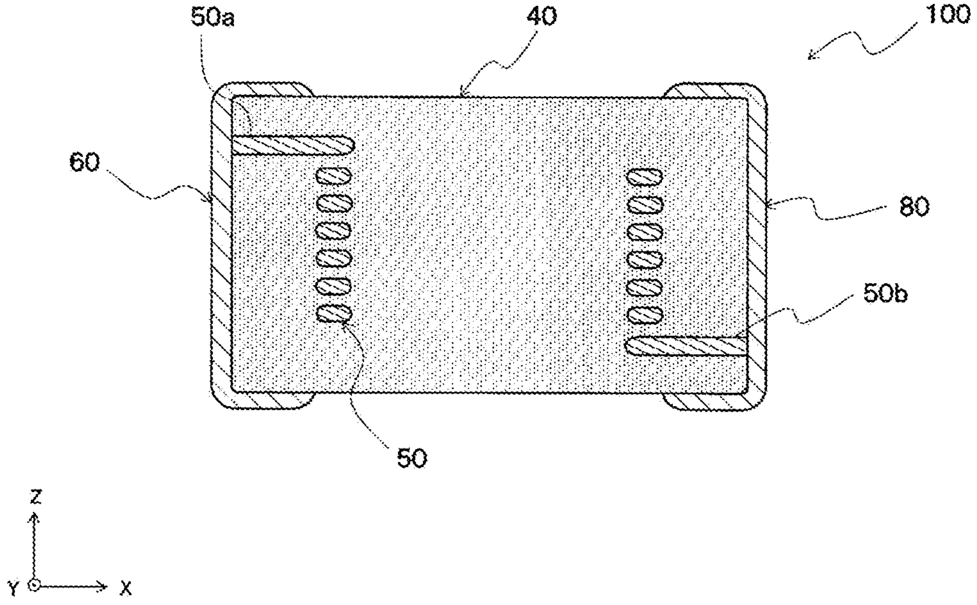
FIG. 6 is a cross-sectional view illustrating an example of a magnetic device including a dust core.

In the magnetic device 100 shown in FIG. 6, an element body is composed of the dust core 40 as shown in FIG. 5. A coil 50 is embedded in the dust core 40, which is the element body, and ends 50_a_ and 50_b_ of the coil 50 are pulled out to the respective end surfaces of the dust core 40. A pair of external electrodes 60 and 80 is formed on the end surfaces of the dust core 40, and the pair of external electrodes 60 and 80 is electrically connected to the ends 50_a_ and 50_b_ of the coil 50, respectively.

Since the dust core 40 forming the element body has a good withstand voltage characteristic, the magnetic device 100 of the present embodiment is favorable for, for example, power inductors used in power supply circuits. The magnetic device including the soft magnetic alloy powder 1 is not limited to the mode as shown in FIG. 6 and may be formed by winding a wire around the surface of the dust core having a predetermined shape by a predetermined number of turns.

Hereinabove, an embodiment of the present disclosure is described, but the present disclosure is not limited to the above-mentioned embodiment and may be variously modified within the scope of the present disclosure.

Examples

Hereinafter, the present disclosure is described in further detail based on specific examples, but is not limited to the following examples. In the following tables, a sample number with "*" mark indicates a comparative example.

(Experiment 1)

In Experiment 1, six types of soft magnetic alloy powders (Powder A to Powder F) shown in Table 1 were produced. All of Powder A to Powder F were prepared by the following procedure.

First, pure metal raw materials of Fe, Co, and other subcomponents were prepared and weighed so as to obtain a desired composition after melting. Then, the weighed pure metal raw materials were melted by high-frequency heating in an evacuated chamber to obtain a mother alloy. Next, the produced mother alloy was heated at 1500° C. and melted again, and a powder having a predetermined composition was thereafter obtained by a high-pressure water atomizing method. After the atomization, the obtained powder was classified by a predetermined method to adjust the particle size of the powder. The average particle size (D50) of Powder A to Powder F produced by the above-mentioned method was all within the range of 15 μm to 25 μm.

TABLE 1

| Powder No. | Type | Composition System |
|---|---|---|
| Powder A | Fe based amorphous | Fe—B—Si—C |
| Powder B | FeCo based amorphous | Fe—Co—B—Si—C |
| Powder C | Fe based nanocrystal | Fe—Nb—B—Si—Cu |

TABLE 1-continued

| Powder No. | Type | Composition System |
|---|---|---|
| Powder D | FeCo based nanocrystal | Fe—Co—Nb—B—Si—Cu |
| Powder E | Fe based crystalline | Fe—Si |
| Powder F | FeCo based crystalline | Fe—Co—Si |

Next, each of Powder A to Powder F was divided into a plurality of samples, and each sample was subjected to a surface treatment under any of the conditions shown in Table 2.

In Conditions 1 to 5, the powder samples were subjected to a heat treatment while controlling the oxygen partial pressure within the range shown in Table 2. The temperature of the heat treatment was determined in an optimum range according to the composition of Powder A to Powder F.

In Conditions 6 to 10, the powder samples were subjected to a surface modification treatment by a mechanochemical method. At this time, the oxygen partial pressure in the rotating rotor was controlled within the range shown in Table 2 using AMS-Lab manufactured by Hosokawa Micron Corporation as a mechanofusion apparatus.

In Condition 11, a coating layer with a two-layer structure was formed on each of the surfaces of the particles constituting the powder sample by the following procedure. First, an aqueous solution of cobalt phosphate and the powder sample were put into a V-type mixer and sufficiently mixed, and the powder sample taken out of the mixer was thereafter sufficiently dried in the atmosphere. Next, the above-mentioned powder sample and a treatment liquid containing a phosphate and a silica source were put into a V-type mixer and sufficiently mixed, and the powder sample taken out of the mixer was thereafter sufficiently dried at 150-250° C. in the atmosphere.

The coating treatment of Condition 11 was performed only on the samples divided from Powder A. In the samples subjected to the coating treatment of Condition 11, a coating layer containing Co was formed on the contact side with the particle body, and a coating layer containing Si was formed on the coating layer containing Co. The total thickness of the coating layers formed by the coating treatment of Condition 11 (the sum of the thickness of the coating layer containing Co and the thickness of the coating layer containing Si) was within the range of 5 nm to 10 nm.

TABLE 2

| Condition No. | Surface Treatment Method | Atmosphere Gas | Oxygen Partial Pressure |
|---|---|---|---|
| Condition 1 | heat treatment | Ar | 20 ppm |
| Condition 2 | heat treatment | Ar + $O_2$ | 100~300 ppm |
| Condition 3 | heat treatment | Ar + $O_2$ | 500~1000 ppm |
| Condition 4 | heat treatment | Ar + $O_2$ | 1000~3000 ppm |
| Condition 5 | heat treatment | Ar + $O_2$ | 5000~10000 pm |
| Condition 6 | mechanochemical | Ar | 20 ppm |
| Condition 7 | mechanochemical | Ar + $O_2$ | 100~300 ppm |
| Condition 8 | mechanochemical | Ar + $O_2$ | 500~1000 ppm |
| Condition 9 | mechanochemical | Ar + $O_2$ | 1000~3000 ppm |
| Condition 10 | mechanochemical | Ar + $O_2$ | 5000~10000 pm |
| Condition 11 | coating | under atmosphere | |

Next, dust cores were produced in the following procedure using the powder sample subjected to any of the surface treatment of Conditions 1 to 11. In Experiment 1, the powder sample subjected to any of Conditions 1 to 11 was a main powder, and a fine powder was mixed with the main powder to obtain a magnetic powder for the dust core. In all of the samples of Experiment 1, an Fe based soft magnetic alloy having an average particle size (D50) of 1 μm was used as the fine powder, and the mass ratio between the main powder and the fine powder was main powder:fine powder=80:20.

Then, the magnetic powder and an epoxy resin were kneaded to obtain a resin compound. In all of the samples of Experiment 1, the blending ratio between the magnetic powder and the epoxy resin was controlled so that the resin content rate in the dust core was 2.5 wt %. A toroidal green compact was obtained by filling the above-mentioned resin compound into a die and pressurizing it. At this time, the compacting pressure was within the range of 1 to 10 tons/$cm^2$ and controlled so that the packing rate of the magnetic powders was at least 80 vol % in all of the samples of Experiment 1. Then, the green compact was heated at 180° C. for 60 minutes to cure the epoxy resin in the green compact, and a dust core having a toroidal shape (outer diameter: 11 mm, inner diameter: 6.5 mm, and thickness: 2.5 mm) was obtained.

In each sample of Experiment 1, the following evaluations were performed on the prepared powder sample (main powder) and dust core.

(Analysis of Surface Layer Structure of Main Powder)

The surface structure of the soft magnetic alloy powders (Powder A to Powder F (main powders)) subjected to the predetermined surface treatment was analyzed by a line analysis using TEM-EDX. In the line analysis, the presence or absence of $L^{Si}_{max}$ (local maximum point of Si concentration), the presence or absence of $L^{Co}_{max}$ (local maximum point of Co concentration), and "$D_{Co}$–$D_{Si}$" were determined.

(Packing Rate of Magnetic Powder in Dust Core)

The dimensions and mass of the produced dust core were measured, and the density p of the dust core was calculated from the dimensions and mass. Moreover, the theoretical density of the dust core was calculated from the specific gravity of the magnetic powder, assuming that the dust core was composed of only the magnetic powder. Then, the packing rate of the magnetic powder in the dust core was calculated by dividing the density p by the theoretical density.

(Relative Permeability of Dust Core)

A polyurethane copper wire (UEW wire) was wound around the toroidal dust core. Then, an inductance of the dust core at a frequency of 100 kHz was measured using an LCR meter (4284A manufactured by Agilent Technologies), and a relative permeability (no unit) of the dust core was calculated based on the inductance.

(Withstand Voltage Characteristic of Dust Core)

In the measurement of withstand voltage characteristic, a cylindrical test core was produced in the same manner as the toroidal core, and In—Ga electrodes were formed on both end surfaces of the test core. Next, a voltage was applied to the test core using a withstand voltage tester (THK-2011ADMPT manufactured by Tama Densoku Co., Ltd.), and a voltage value when an electric current of 1 mA flowed was measured. Then, a withstand voltage of the test core was measured by dividing the measured voltage value by the length of the test core (distance between the end surfaces).

The withstand voltages were measured on 20 test cores for each sample, and an average value of the 20 test cores was taken as the withstand voltage of each sample. Then, the withstand voltage of each sample was relatively evaluated using the withstand voltage of the reference sample. Specifically, a dust core was produced using a powder not subjected to the surface treatment shown in Table 2 and used as the reference sample. Then, a sample exhibiting a withstand voltage of less than 1.3 times with respect to the withstand voltage of the reference sample was considered to be "failed (F)", a sample exhibiting a withstand voltage of 1.3 times or more and less than 1.5 times was considered to be "good (G)", and a sample exhibiting a withstand voltage of 1.5 times or more was considered to be "very good (VG)".

A Weibull plot was obtained using the withstand voltage data of the 20 test cores as a population, and a m value (no unit) of each sample was calculated from the Weibull plot. The m value is an index showing the degree of variation in withstand voltage. A m value of 3.0 or more was considered to be good, and a m value of 5.5 or more was considered to be very good.

The evaluation results of each sample in Experiment 1 are shown in Tables 3-8. Table 3 shows evaluation results of samples using Powder A as the main powder, Table 4 shows evaluation results of samples using Powder B as the main powder, Table 5 shows evaluation results of samples using Powder C as the main powder, Table 6 shows evaluation results of samples using Powder D as the main powder, Table 7 shows evaluation results of samples using Powder E as the main powder, and Table 8 shows evaluation results of samples using Powder F as the main powder. In each table, "-" in the column of surface treatment method means that the surface treatment shown in Table 2 was not performed. In addition, "-" in the column of $D_{Co}$–$D_{Si}$ in each table means that $D_{Co}$–$D_{Si}$ could not be measured because the surface layer of the main powder did not include $L^{Si}_{max}$ and/or $L^{Co}_{max}$.

TABLE 3

| | Magnetic Powder | | | Dust Core | | Line Analysis Results | | | Characteristics | | |
|---|---|---|---|---|---|---|---|---|---|---|---|
| | Main Powder | | Fine | Resin | | $L^{Si}_{max}$ | $L^{Co}_{max}$ | | | | |
| Sample No. | Type | Surface Treatment | Powder Type | Content Rate wt % | Packing Rate vol % | Presence or Absence | Presence or Absence | $D_{co}$ − $D_{si}$ nm | Relative Permeability | Withstand Voltage | m Value |
| A-1* | powder A | — | Fe | 2.5 | 80.5 | absent | absent | — | 38.0 | reference | 2.2 |
| A-2* | powder A | condition 1 | Fe | 2.5 | 80.9 | present | absent | — | 38.6 | F | 2.4 |
| A-3* | powder A | condition 2 | Fe | 2.5 | 80.8 | present | absent | — | 38.6 | F | 2.4 |
| A-4* | powder A | condition 3 | Fe | 2.5 | 81.5 | present | absent | — | 39.4 | F | 2.3 |
| A-5* | powder A | condition 4 | Fe | 2.5 | 81.0 | present | absent | — | 38.7 | F | 2.2 |
| A-6* | powder A | condition 5 | Fe | 2.5 | 81.4 | present | absent | — | 39.0 | F | 2.0 |
| A-7* | powder A | condition 6 | Fe | 2.5 | 81.3 | present | absent | — | 39.0 | F | 2.4 |
| A-8* | powder A | condition 7 | Fe | 2.5 | 80.6 | present | absent | — | 38.2 | F | 2.4 |
| A-9* | powder A | condition 8 | Fe | 2.5 | 80.8 | present | absent | — | 38.6 | F | 2.3 |
| A-10* | powder A | condition 9 | Fe | 2.5 | 80.6 | present | absent | — | 38.1 | F | 2.2 |
| A-11* | powder A | condition 10 | Fe | 2.5 | 80.6 | present | absent | — | 38.2 | F | 2.0 |
| A-12* | powder A | condition 11 | Fe | 2.5 | 80.7 | present | present | −1.5 | 38.3 | G | 2.1 |

TABLE 4

| | Magnetic Powder | | | Dust Core | | Line Analysis Results | | | Characteristics | | |
|---|---|---|---|---|---|---|---|---|---|---|---|
| | Main Powder | | Fine | Resin | | $L^{Si}_{max}$ | $L^{Co}_{max}$ | | | | |
| Sample No. | Type | Surface Treatment | Powder Type | Content Rate wt % | Packing Rate vol % | Presence or Absence | Presence or Absence | $D_{co}$ − $D_{si}$ nm | Relative Permeability | Withstand Voltage | m Value |
| B-1* | powder B | — | Fe | 2.5 | 80.6 | absent | absent | — | 38.8 | reference | 2.3 |
| B-2* | powder B | condition 1 | Fe | 2.5 | 81.1 | absent | absent | — | 39.9 | F | 2.4 |
| B-3* | powder B | condition 2 | Fe | 2.5 | 81.2 | present | absent | — | 38.3 | F | 2.4 |
| B-4* | powder B | condition 3 | Fe | 2.5 | 81.2 | present | absent | — | 40.3 | F | 2.3 |
| B-5* | powder B | condition 4 | Fe | 2.5 | 81.2 | present | absent | — | 40.3 | F | 2.2 |
| B-6* | powder B | condition 5 | Fe | 2.5 | 81.3 | present | absent | — | 40.3 | F | 2.0 |
| B-7* | powder B | condition 6 | Fe | 2.5 | 80.6 | present | present | −1.7 | 39.3 | F | 3.0 |
| B-8 | powder B | condition 7 | Fe | 2.5 | 80.6 | present | present | 0.2 | 39.3 | G | 3.5 |
| B-9 | powder B | condition 8 | Fe | 2.5 | 80.9 | present | present | 5.8 | 39.6 | VG | 5.9 |
| B-10 | powder B | condition 9 | Fe | 2.5 | 81.0 | present | present | 3.5 | 39.5 | G | 4.9 |
| B-11* | powder B | condition 10 | Fe | 2.5 | 81.4 | present | present | −0.8 | 40.1 | F | 2.7 |

TABLE 5

| | | | | Dust Core | | Line Analysis Results | | | | | |
|---|---|---|---|---|---|---|---|---|---|---|---|
| | Magnetic Powder | | | Resin | | $L^{Si}_{max}$ | $L^{Co}_{max}$ | | | | |
| | Main Powder | | Fine | Content | Packing | Presence | Presence | | Characteristics | | |
| Sample No. | Type | Surface Treatment | Powder Type | Rate wt % | Rate vol % | or Absence | or Absence | $D_{co} - D_{si}$ nm | Relative Permeability | Withstand Voltage | m Value |
| C-1* | powder C | — | Fe | 2.5 | 81.1 | absent | absent | — | 51.9 | reference | 2.3 |
| C-2* | powder C | condition 1 | Fe | 2.5 | 81.0 | present | absent | — | 51.3 | F | 2.5 |
| C-3* | powder C | condition 2 | Fe | 2.5 | 80.8 | present | absent | — | 51.2 | F | 2.5 |
| C-4* | powder C | condition 3 | Fe | 2.5 | 80.6 | present | absent | — | 50.7 | F | 2.4 |
| C-5* | powder C | condition 4 | Fe | 2.5 | 81.4 | present | absent | — | 52.4 | F | 2.3 |
| C-6* | powder C | condition 5 | Fe | 2.5 | 80.8 | present | absent | — | 51.1 | F | 2.1 |
| C-7* | powder C | condition 6 | Fe | 2.5 | 80.7 | present | absent | — | 51.2 | F | 2.5 |
| C-8* | powder C | condition 7 | Fe | 2.5 | 80.9 | present | absent | — | 51.3 | F | 2.5 |
| C-9* | powder C | condition 8 | Fe | 2.5 | 80.7 | present | absent | — | 51.2 | F | 2.4 |
| C-10* | powder C | condition 9 | Fe | 2.5 | 81.1 | present | absent | — | 52.0 | F | 2.3 |
| C-11* | powder C | condition 10 | Fe | 2.5 | 81.3 | present | absent | — | 52.2 | F | 2.1 |

TABLE 6

| | | | | Dust Core | | Line Analysis Results | | | | | |
|---|---|---|---|---|---|---|---|---|---|---|---|
| | Magnetic Powder | | | Resin | | $L^{Si}_{max}$ | $L^{Co}_{max}$ | | | | |
| | Main Powder | | Fine | Content | Packing | Presence | Presence | | Characteristics | | |
| Sample No. | Type | Surface Treatment | Powder Type | Rate wt % | Rate vol % | or Absence | or Absence | $D_{co} - D_{si}$ nm | Relative Permeability | Withstand Voltage | m Value |
| D-1* | powder D | — | Fe | 2.5 | 81.2 | absent | absent | — | 44.0 | reference | 2.3 |
| D-2* | powder D | condition 1 | Fe | 2.5 | 80.8 | absent | absent | — | 43.2 | F | 2.4 |
| D-3* | powder D | condition 2 | Fe | 2.5 | 81.4 | present | absent | — | 47.1 | F | 2.4 |
| D-4* | powder D | condition 3 | Fe | 2.5 | 80.7 | present | absent | — | 45.2 | F | 2.3 |
| D-5* | powder D | condition 4 | Fe | 2.5 | 81.2 | present | absent | — | 43.3 | F | 2.2 |
| D-6* | powder D | condition 5 | Fe | 2.5 | 81.1 | present | absent | — | 46.9 | F | 2.0 |
| D-7* | powder D | condition 6 | Fe | 2.5 | 81.4 | present | present | −1.1 | 45.9 | F | 2.9 |
| D-8 | powder D | condition 7 | Fe | 2.5 | 81.1 | present | present | 0.3 | 43.3 | G | 3.2 |
| D-9 | powder D | condition 8 | Fe | 2.5 | 81.0 | present | present | 6.7 | 46.9 | VG | 5.7 |
| D-10 | powder D | condition 9 | Fe | 2.5 | 80.6 | present | present | 3.5 | 45.2 | G | 4.7 |
| D-11* | powder D | condition 10 | Fe | 2.5 | 81.0 | present | present | −0.8 | 46.9 | F | 2.3 |

TABLE 7

| | | | | Dust Core | | Line Analysis Results | | | | | |
|---|---|---|---|---|---|---|---|---|---|---|---|
| | Magnetic Powder | | | Resin | | $L^{Si}_{max}$ | $L^{Co}_{max}$ | | | | |
| | Main Powder | | Fine | Content | Packing | Presence | Presence | | Characteristics | | |
| Sample No. | Type | Surface Treatment | Powder Type | Rate wt % | Rate vol % | or Absence | or Absence | $D_{co} - D_{si}$ nm | Relative Permeability | Withstand Voltage | m Value |
| E-1* | powder E | — | Fe | 2.5 | 81.5 | absent | absent | — | 42.8 | reference | 2.2 |
| E-2* | powder E | condition 1 | Fe | 2.5 | 81.0 | present | absent | — | 41.4 | F | 2.4 |
| E-3* | powder E | condition 2 | Fe | 2.5 | 80.9 | present | absent | — | 41.2 | F | 2.3 |
| E-4* | powder E | condition 3 | Fe | 2.5 | 81.5 | present | absent | — | 42.7 | F | 2.2 |
| E-5* | powder E | condition 4 | Fe | 2.5 | 80.8 | present | absent | — | 40.8 | F | 2.0 |
| E-6* | powder E | condition 5 | Fe | 2.5 | 81.0 | present | absent | — | 41.6 | F | 2.4 |
| E-7* | powder E | condition 6 | Fe | 2.5 | 81.1 | present | absent | — | 41.6 | F | 2.4 |
| E-8* | powder E | condition 7 | Fe | 2.5 | 80.7 | present | absent | — | 40.8 | F | 2.3 |
| E-9* | powder E | condition 8 | Fe | 2.5 | 81.1 | present | absent | — | 41.9 | F | 2.2 |
| E-10* | powder E | condition 9 | Fe | 2.5 | 80.7 | present | absent | — | 40.6 | F | 2.0 |
| E-11* | powder E | condition 10 | Fe | 2.5 | 81.1 | present | absent | — | 41.6 | F | 2.0 |

TABLE 8

| Sample No. | Magnetic Powder: Main Powder Type | Magnetic Powder: Main Powder Surface Treatment | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|
| F-1* | powder F | — | Fe | 2.5 | 81.2 | absent | absent | — | 36.0 | reference | 2.3 |
| F-2* | powder F | condition 1 | Fe | 2.5 | 80.9 | absent | absent | — | 35.7 | F | 2.4 |
| F-3* | powder F | condition 2 | Fe | 2.5 | 81.3 | present | absent | — | 36.3 | F | 2.4 |
| F-4* | powder F | condition 3 | Fe | 2.5 | 80.8 | present | absent | — | 35.6 | F | 2.3 |
| F-5* | powder F | condition 4 | Fe | 2.5 | 81.3 | present | absent | — | 36.0 | F | 2.2 |
| F-6* | powder F | condition 5 | Fe | 2.5 | 81.2 | present | absent | — | 35.9 | F | 2.0 |
| F-7* | powder F | condition 6 | Fe | 2.5 | 80.7 | present | present | −1.6 | 35.6 | F | 2.4 |
| F-8 | powder F | condition 7 | Fe | 2.5 | 81.4 | present | present | 0.2 | 36.4 | G | 3.5 |
| F-9 | powder F | condition 8 | Fe | 2.5 | 80.8 | present | present | 7.0 | 35.6 | VG | 5.9 |
| F-10 | powder F | condition 9 | Fe | 2.5 | 81.2 | present | present | 3.8 | 36.3 | G | 4.4 |
| F-11* | powder F | condition 10 | Fe | 2.5 | 81.1 | present | present | −0.5 | 35.9 | F | 2.8 |

As shown in Table 3, Table 5, and Table 7, the withstand voltage characteristic was not improved even when the surface modification treatment by the mechanochemical method was performed in the sample using the main powder (Powder A, Powder C, or Powder E) not containing Co. The withstand voltage characteristic was improved in Sample A-12 subjected to the coating treatment of Condition 11. However, in Sample A-12 satisfying $0>(D_{Co}-D_{Si})$, the variation in withstand voltage was large, and the m value was not improved.

On the other hand, as shown in Table 4, Table 6, and Table 8, $L^{Si}_{max}$ and $L^{Co}_{max}$ were formed on the particle surface layer by performing a surface modification treatment by a mechanochemical method in the sample using the main powder containing Co (Powder B, Powder D, or Powder F). Then, a high withstand voltage and a high m value were obtained in the sample satisfying $0\leq(D_{Co}-D_{Si})$. In addition, a relative permeability comparable to that of the reference sample was obtained in the sample satisfying $0\leq(D_{Co}-D_{Si})$. This result indicates that when the surface layer of the soft magnetic alloy powder includes $L^{Si}_{max}$ and $L^{Co}_{max}$ and satisfies $D_{Si}\leq D_{Co}$, the withstand voltage and the m value can be improved with a high relative permeability. In particular, it was found that when $3\leq(D_{Co}-D_{Si})$ is satisfied, the withstand voltage and the m value are further improved.

In the sample satisfying $0\leq(D_{Co}-D_{Si})$, the surface layer of the soft magnetic alloy powder includes an oxide phase containing Si and an oxide phase containing Co.

(Experiment 2)

In Experiment 2, dust cores were produced using a fine powder different from that in Experiment 1 and a main powder (Powder B, Powder D, or Powder F). Specifically, in Experiment 2, the fine powder was an FeNi based soft magnetic alloy powder having an average particle size (D50) of 1 μm. In Experiment 2, the experimental conditions other than the type of fine powder were the same as those in Experiment 1, and the same evaluations as in Experiment 1 were performed. The evaluation results of Experiment 2 are shown in Tables 9-11. In addition to the results of Experiment 2, Tables 9-11 also show the evaluation results of Experiment 1 using the Fe based fine powder.

TABLE 9

| Sample No. | Magnetic Powder: Main Powder Type | Magnetic Powder: Main Powder Surface Treatment | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|
| B-1* | powder B | — | Fe | 2.5 | 80.6 | absent | absent | — | 38.8 | reference | 2.3 |
| B2-1* | powder B | — | FeNi | 2.5 | 80.8 | absent | absent | — | 39.1 | F | 2.3 |
| B-2* | powder B | condition 1 | Fe | 2.5 | 81.1 | absent | absent | — | 39.9 | F | 2.4 |
| B2-2* | powder B | condition 1 | FeNi | 2.5 | 81.4 | absent | absent | — | 39.9 | F | 2.4 |
| B-3* | powder B | condition 2 | Fe | 2.5 | 81.2 | present | absent | — | 38.3 | F | 2.4 |
| B2-3* | powder B | condition 2 | FeNi | 2.5 | 81.2 | present | absent | — | 39.9 | F | 2.4 |
| B-4* | powder B | condition 3 | Fe | 2.5 | 81.2 | present | absent | — | 40.3 | F | 2.3 |
| B2-4* | powder B | condition 3 | FeNi | 2.5 | 80.8 | present | absent | — | 39.4 | F | 2.3 |
| B-5* | powder B | condition 4 | Fe | 2.5 | 81.2 | present | absent | — | 40.3 | F | 2.2 |
| B2-5* | powder B | condition 4 | FeNi | 2.5 | 81.3 | present | absent | — | 40.3 | F | 2.2 |
| B-6* | powder B | condition 5 | Fe | 2.5 | 81.3 | present | absent | — | 40.3 | F | 2.0 |
| B2-6* | powder B | condition 5 | FeNi | 2.5 | 81.3 | present | absent | — | 40.3 | F | 2.0 |
| B-7* | powder B | condition 6 | Fe | 2.5 | 80.6 | present | present | −1.7 | 39.3 | F | 3.0 |
| B2-7* | powder B | condition 6 | FeNi | 2.5 | 81.2 | present | present | −1.7 | 40.3 | F | 3.0 |
| B-8 | powder B | condition 7 | Fe | 2.5 | 80.6 | present | present | 0.2 | 39.3 | G | 3.5 |
| B2-8 | powder B | condition 7 | FeNi | 2.5 | 81.4 | present | present | 0.2 | 40.1 | G | 3.5 |
| B-9 | powder B | condition 8 | Fe | 2.5 | 80.9 | present | present | 5.8 | 39.6 | VG | 5.9 |
| B2-9 | powder B | condition 8 | FeNi | 2.5 | 81.4 | present | present | 5.8 | 40.1 | VG | 5.9 |
| B-10 | powder B | condition 9 | Fe | 2.5 | 81.0 | present | present | 3.5 | 39.5 | G | 4.9 |

TABLE 9-continued

| | Magnetic Powder | | | Dust Core | | Line Analysis Results | | | | | |
|---|---|---|---|---|---|---|---|---|---|---|---|
| | Main Powder | | Fine | Resin Content | Packing | $L^{Si}_{max}$ Presence | $L^{Co}_{max}$ Presence | | Characteristics | | |
| Sample No. | Type | Surface Treatment | Powder Type | Rate wt % | Rate vol % | or Absence | or Absence | $D_{co} - D_{si}$ nm | Relative Permeability | Withstand Voltage | m Value |
| B2-10 | powder B | condition 9 | FeNi | 2.5 | 80.7 | present | present | 3.5 | 39.1 | G | 4.9 |
| B-11* | powder B | condition 10 | Fe | 2.5 | 81.4 | present | present | −0.8 | 40.1 | F | 2.7 |
| B2-11* | powder B | condition 10 | FeNi | 2.5 | 81.0 | present | present | −0.8 | 39.5 | F | 2.7 |

TABLE 10

| | Magnetic Powder | | | Dust Core | | Line Analysis Results | | | | | |
|---|---|---|---|---|---|---|---|---|---|---|---|
| | Main Powder | | Fine | Resin Content | Packing | $L^{Si}_{max}$ Presence | $L^{Co}_{max}$ Presence | | Characteristics | | |
| Sample No. | Type | Surface Treatment | Powder Type | Rate wt % | Rate vol % | or Absence | or Absence | $D_{co} - D_{si}$ nm | Relative Permeability | Withstand Voltage | m Value |
| D-1* | powder D | — | Fe | 2.5 | 81.2 | absent | absent | — | 44.0 | reference | 2.3 |
| D2-1* | powder D | — | FeNi | 2.5 | 81.5 | absent | absent | — | 45.9 | F | 2.3 |
| D-2* | powder D | condition 1 | Fe | 2.5 | 80.8 | absent | absent | — | 43.2 | F | 2.4 |
| D2-2* | powder D | condition 1 | FeNi | 2.5 | 80.6 | absent | absent | — | 45.2 | F | 2.4 |
| D-3* | powder D | condition 2 | Fe | 2.5 | 81.4 | present | absent | — | 47.1 | F | 2.4 |
| D2-3* | powder D | condition 2 | FeNi | 2.5 | 81.2 | present | absent | — | 45.1 | F | 2.4 |
| D-4* | powder D | condition 3 | Fe | 2.5 | 80.7 | present | absent | — | 45.2 | F | 2.3 |
| D2-4* | powder D | condition 3 | FeNi | 2.5 | 81.1 | present | absent | — | 43.3 | F | 2.3 |
| D-5* | powder D | condition 4 | Fe | 2.5 | 81.2 | present | absent | — | 43.3 | F | 2.2 |
| D2-5* | powder D | condition 4 | FeNi | 2.5 | 81.4 | present | absent | — | 47.1 | F | 2.2 |
| D-6* | powder D | condition 5 | Fe | 2.5 | 81.1 | present | absent | — | 46.9 | F | 2.0 |
| D2-6* | powder D | condition 5 | FeNi | 2.5 | 81.0 | present | absent | — | 46.9 | F | 2.0 |
| D-7* | powder D | condition 6 | Fe | 2.5 | 81.4 | present | present | −1.1 | 45.9 | F | 2.9 |
| D2-7* | powder D | condition 6 | FeNi | 2.5 | 81.3 | present | present | −1.1 | 47.1 | F | 2.9 |
| D-8 | powder D | condition 7 | Fe | 2.5 | 81.1 | present | present | 0.3 | 43.3 | G | 3.2 |
| D2-8 | powder D | condition 7 | FeNi | 2.5 | 81.3 | present | present | 0.3 | 45.1 | G | 3.2 |
| D-9 | powder D | condition 8 | Fe | 2.5 | 81.0 | present | present | 6.7 | 46.9 | VG | 5.7 |
| D2-9 | powder D | condition 8 | FeNi | 2.5 | 80.5 | present | present | 6.7 | 43.2 | VG | 5.7 |
| D-10 | powder D | condition 9 | Fe | 2.5 | 80.6 | present | present | 3.5 | 45.2 | G | 4.7 |
| D2-10 | powder D | condition 9 | FeNi | 2.5 | 81.5 | present | present | 3.5 | 45.9 | G | 4.7 |
| D-11* | powder D | condition 10 | Fe | 2.5 | 81.0 | present | present | −0.8 | 46.9 | F | 2.3 |
| D2-11* | powder D | condition 10 | FeNi | 2.5 | 80.9 | present | present | −0.8 | 43.8 | F | 2.3 |

TABLE 11

| | Magnetic Powder | | | Dust Core | | Line Analysis Results | | | | | |
|---|---|---|---|---|---|---|---|---|---|---|---|
| | Main Powder | | Fine | Resin Content | Packing | $L^{Si}_{max}$ Presence | $L^{Co}_{max}$ Presence | | Characteristics | | |
| Sample No. | Type | Surface Treatment | Powder Type | Rate wt % | Rate vol % | or Absence | or Absence | $D_{co} - D_{si}$ nm | Relative Permeability | Withstand Voltage | m Value |
| F-1* | powder F | — | Fe | 2.5 | 81.2 | absent | absent | — | 36.0 | reference | 2.3 |
| F2-1* | powder F | — | FeNi | 2.5 | 81.4 | absent | absent | — | 36.4 | F | 2.3 |
| F-2* | powder F | condition 1 | Fe | 2.5 | 80.9 | absent | absent | — | 35.7 | F | 2.4 |
| F2-2* | powder F | condition 1 | FeNi | 2.5 | 80.5 | absent | absent | — | 35.6 | F | 2.4 |
| F-3* | powder F | condition 2 | Fe | 2.5 | 81.3 | present | absent | — | 36.3 | F | 2.4 |
| F2-3* | powder F | condition 2 | FeNi | 2.5 | 80.5 | present | absent | — | 35.6 | F | 2.4 |
| F-4* | powder F | condition 3 | Fe | 2.5 | 80.8 | present | absent | — | 35.6 | F | 2.3 |
| F2-4* | powder F | condition 3 | FeNi | 2.5 | 80.6 | present | absent | — | 35.6 | F | 2.3 |
| F-5* | powder F | condition 4 | Fe | 2.5 | 81.3 | present | absent | — | 36.0 | F | 2.2 |
| F2-5* | powder F | condition 4 | FeNi | 2.5 | 81.4 | present | absent | — | 36.4 | F | 2.2 |
| F-6* | powder F | condition 5 | Fe | 2.5 | 81.2 | present | absent | — | 35.9 | F | 2.0 |
| F2-6* | powder F | condition 5 | FeNi | 2.5 | 81.1 | present | absent | — | 35.8 | F | 2.0 |
| F-7* | powder F | condition 6 | Fe | 2.5 | 80.7 | present | present | −1.6 | 35.6 | F | 2.4 |

TABLE 11-continued

| Sample No. | Magnetic Powder: Main Powder: Type | Magnetic Powder: Main Powder: Surface Treatment | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|
| F2-7* | powder F | condition 6 | FeNi | 2.5 | 80.8 | present | present | −1.6 | 35.6 | F | 2.4 |
| F-8 | powder F | condition 7 | Fe | 2.5 | 81.4 | present | present | 0.2 | 36.4 | G | 3.5 |
| F2-8 | powder F | condition 7 | FeNi | 2.5 | 80.6 | present | present | 0.2 | 35.6 | G | 3.5 |
| F-9 | powder F | condition 8 | Fe | 2.5 | 80.8 | present | present | 7.0 | 35.6 | VG | 5.9 |
| F2-9 | powder F | condition 8 | FeNi | 2.5 | 80.9 | present | present | 7.0 | 35.5 | VG | 5.9 |
| F-10 | powder F | condition 9 | Fe | 2.5 | 81.2 | present | present | 3.8 | 36.3 | G | 4.4 |
| F2-10 | powder F | condition 9 | FeNi | 2.5 | 80.7 | present | present | 3.8 | 35.6 | G | 4.4 |
| F-11* | powder F | condition 10 | Fe | 2.5 | 81.1 | present | present | −0.5 | 35.9 | F | 2.8 |
| F2-11* | powder F | condition 10 | FeNi | 2.5 | 80.8 | present | present | −0.5 | 35.5 | F | 2.8 |

The results of Tables 9 to 11 indicate that the relative permeability may change by changing the type of fine powder. In the sample satisfying $D_{Si} \leq D_{Co}$, even when the relative permeability was changed by the type of fine powder, the withstand voltage characteristic did not change, and a high withstand voltage and a high m value were obtained.

(Experiment 3)

In each sample of Experiment 3, the resin content rate in the dust core was changed. Specifically, an epoxy resin and a magnetic powder containing a predetermined main powder (Powder B, Powder D, or Powder F) were kneaded so that the resin content rate was 2.5 wt %, 2.0 wt %, 1.5 wt %, or 1.0 wt %. In Experiment 3, the experimental conditions other than the resin content rate were the same as those in Experiment 1, and the same evaluations as in Experiment 1 were performed. The evaluation results of Experiment 3 are shown in Tables 12-14.

TABLE 12

| Sample No. | Magnetic Powder: Main Powder: Type | Magnetic Powder: Main Powder: Surface Treatment | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|
| B-1* | powder B | — | Fe | 2.5 | 80.6 | absent | absent | — | 38.8 | reference | 2.3 |
| B3-1* | powder B | — | Fe | 2.0 | 81.6 | absent | absent | — | 40.5 | F | 2.2 |
| B3-2* | powder B | — | Fe | 1.5 | 82.9 | absent | absent | — | 42.1 | F | 2.0 |
| B3-3* | powder B | — | Fe | 1.0 | 83.9 | absent | absent | — | 42.9 | F | 1.8 |
| B-9 | powder B | condition 8 | Fe | 2.5 | 80.9 | present | present | 5.8 | 39.6 | VG | 5.9 |
| B3-4 | powder B | condition 8 | Fe | 2.0 | 82.1 | present | present | 5.8 | 40.9 | VG | 6.0 |
| B3-5 | powder B | condition 8 | Fe | 1.5 | 83.1 | present | present | 5.8 | 42.2 | VG | 5.8 |
| B3-6 | powder B | condition 8 | Fe | 1.0 | 84.5 | present | present | 5.8 | 43.9 | VG | 5.7 |

TABLE 13

| Sample No. | Magnetic Powder: Main Powder: Type | Magnetic Powder: Main Powder: Surface Treatment | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|
| D-1* | powder D | — | Fe | 2.5 | 81.2 | absent | absent | — | 44.0 | reference | 2.3 |
| D3-1* | powder D | — | Fe | 2.0 | 82.5 | absent | absent | — | 46.3 | F | 2.1 |
| D3-2* | powder D | — | Fe | 1.5 | 83.6 | absent | absent | — | 51.3 | F | 1.9 |
| D3-3* | powder D | — | Fe | 1.0 | 85.0 | absent | absent | — | 50.6 | F | 1.7 |
| D-9 | powder D | condition 8 | Fe | 2.5 | 81.0 | present | present | 6.7 | 46.9 | VG | 5.7 |
| D3-4 | powder D | condition 8 | Fe | 2.0 | 82.3 | present | present | 6.7 | 48.0 | VG | 5.6 |
| D3-5 | powder D | condition 8 | Fe | 1.5 | 83.6 | present | present | 6.7 | 51.3 | VG | 5.4 |
| D3-6 | powder D | condition 8 | Fe | 1.0 | 84.7 | present | present | 6.7 | 52.8 | VG | 5.2 |

TABLE 14

| Sample No. | Magnetic Powder: Main Powder: Type | Magnetic Powder: Main Powder: Surface Treatment | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|
| F-1* | powder F | — | Fe | 2.5 | 81.2 | absent | absent | — | 36.0 | reference | 2.3 |
| F3-1* | powder F | — | Fe | 2.0 | 82.6 | absent | absent | — | 37.3 | F | 2.1 |
| F3-2* | powder F | — | Fe | 1.5 | 84.0 | absent | absent | — | 38.6 | F | 2.0 |
| F3-3* | powder F | — | Fe | 1.0 | 85.1 | absent | absent | — | 39.5 | F | 1.8 |
| F-9 | powder F | condition 8 | Fe | 2.5 | 80.8 | present | present | 7.0 | 35.6 | VG | 5.9 |
| F3-4 | powder F | condition 8 | Fe | 2.0 | 82.2 | present | present | 7.0 | 36.7 | VG | 5.8 |
| F3-5 | powder F | condition 8 | Fe | 1.5 | 83.6 | present | present | 7.0 | 38.2 | VG | 5.6 |
| F3-6 | powder F | condition 8 | Fe | 1.0 | 84.9 | present | present | 7.0 | 39.1 | VG | 5.4 |

As shown in Tables 12-14, in each of the samples including no surface layer 10, the relative permeability was improved by reducing the resin content rate, but the withstand voltage and the m value were reduced. On the other hand, in each of the sample including the surface layer 10 satisfying $D_{Si} \leq D_{Co}$, a high withstand voltage and a high m value were obtained even though the resin content rate was reduced. That is, the sample satisfying $D_{Si} \leq D_{Co}$ can achieve both a high relative permeability and a high withstand voltage characteristic even when the resin content rate is reduced.

(Experiment 4)

In Experiment 4, an insulating layer composed of a phosphate based compound was formed on each particle surface of the main powder (Powder B, Powder D, or Powder F) by phosphate treatment. Specifically, samples each including only the insulating layer without performing a mechanochemical treatment and samples each including the insulating layer after performing a mechanochemical treatment were prepared. In all of the samples of Experiment 4, the average thickness of the insulating layers was within the range of 1 nm to 50 nm, and the resin content rate was 1.0 wt %. In Experiment 4, the experimental conditions other than the above were the same as those in Experiment 1, and the same evaluations as in Experiment 1 were performed. The evaluation results of Experiment 4 are shown in Table 15.

The results in Table 15 indicate that the withstand voltage characteristic was further improved by further forming an insulating layer on the outer surface of the surface layer 10 satisfying $D_{Si} \leq D_{Co}$.

DESCRIPTION OF THE REFERENCE NUMERICAL

1 . . . soft magnetic alloy powder
1*a* . . . first particle
2 . . . particle body
10 . . . surface layer
10*a* . . . outer surface
12 . . . Si oxide phase
14 . . . Co oxide phase
21 . . . interface
1*b* . . . fine particle
4 . . . resin
40 . . . dust core
50 . . . coil
50*a*, 50*b* . . . end
60, 80 . . . external electrode
100 . . . magnetic device

TABLE 15

| Sample No. | Magnetic Powder: Main Powder: Type | Magnetic Powder: Main Powder: Surface Treatment | Magnetic Powder: Main Powder: Insulating Layer | Magnetic Powder: Fine Powder Type | Dust Core: Resin Content Rate wt % | Dust Core: Packing Rate vol % | Line Analysis Results: $L^{Si}_{max}$ Presence or Absence | Line Analysis Results: $L^{Co}_{max}$ Presence or Absence | $D_{co} - D_{si}$ nm | Characteristics: Relative Permeability | Characteristics: Withstand Voltage | Characteristics: m Value |
|---|---|---|---|---|---|---|---|---|---|---|---|---|
| B3-3* | powder B | — | absent | Fe | 1.0 | 83.9 | absent | absent | — | 42.9 | reference | 1.8 |
| B4-1* | powder B | — | present | Fe | 1.0 | 83.8 | absent | absent | — | 43.1 | G | 2.1 |
| B3-6 | powder B | condition 8 | absent | Fe | 1.0 | 84.5 | present | present | 5.8 | 43.9 | VG | 5.7 |
| B4-2 | powder B | condition 8 | present | Fe | 1.0 | 84.4 | present | present | 5.8 | 43.5 | VG | 6.1 |
| D3-3* | powder D | — | absent | Fe | 1.0 | 85.0 | absent | absent | — | 50.6 | reference | 1.7 |
| D4-1* | powder D | — | present | Fe | 1.0 | 84.8 | absent | absent | — | 49.7 | G | 2.2 |
| D3-6 | powder D | condition 8 | absent | Fe | 1.0 | 84.7 | present | present | 6.7 | 52.8 | VG | 5.2 |
| D4-2 | powder D | condition 8 | present | Fe | 1.0 | 84.4 | present | present | 6.7 | 49.4 | VG | 6.3 |
| F3-3* | powder F | — | absent | Fe | 1.0 | 85.1 | absent | absent | — | 39.5 | reference | 1.8 |
| F4-1* | powder F | — | present | Fe | 1.0 | 84.9 | absent | absent | — | 39.1 | G | 1.9 |
| F3-6 | powder F | condition 8 | absent | Fe | 1.0 | 84.9 | present | present | 7.0 | 39.1 | VG | 5.4 |
| F4-2 | powder F | condition 8 | present | Fe | 1.0 | 84.7 | present | present | 7.0 | 39.0 | VG | 6.3 |

What is claimed is:

1. A soft magnetic alloy powder comprising:

a particle body comprising a soft magnetic alloy including Fe and Co; and a surface layer located on a surface side of the particle body, wherein the surface layer includes one or more local maximum points of Si concentration and one or more local maximum points of Co concentration, and $D_{Si} \leq D_{Co}$ is satisfied, in which $D_{Si}$ is a distance from an interface between the particle body and the surface layer to a first Si local maximum point $L^{Si}_{max}$ as a local maximum point located closest to a particle center among the one or more local maximum points of Si concentration, and $D_{Co}$ is a distance from the interface to a first Co local maximum point $L^{Co}_{max}$ as a local maximum point located closest to the particle center among the one or more local maximum points of Co concentration.

2. The soft magnetic alloy powder according to claim 1, wherein $D_{Si} < D_{Co}$ is satisfied.

3. The soft magnetic alloy powder according to claim 1, wherein the surface layer comprises an oxide phase.

4. The soft magnetic alloy powder according to claim 1, wherein the surface layer comprises a Si oxide phase including a Si oxide, and the $L^{Si}_{max}$ exists in the Si oxide phase.

5. The soft magnetic alloy powder according to claim 4, wherein the surface layer comprises a Co oxide phase including a Co oxide, the $L^{Co}_{max}$ exists in the Co oxide phase, and a part of the Co oxide phase overlaps with a part of a surface side of the Si oxide phase.

6. The soft magnetic alloy powder according to claim 4, wherein the surface layer comprises a Co oxide phase including a Co oxide, the $L^{Co}_{max}$ exists in the Co oxide phase, and the Co oxide phase is located closer to a surface side of the surface layer than the Si oxide phase.

7. A dust core comprising the soft magnetic alloy powder according to claim 1.

8. A magnetic device comprising the soft magnetic alloy powder according to claim 1.

* * * * *